United States Patent
Pedersen (10) Patent No.: US 10,796,546 B2
(45) Date of Patent: Oct. 6, 2020

(54) THEFT PREVENTION SYSTEM AND METHOD

(71) Applicant: Alert Systems ApS, Horsholm (DK)

(72) Inventor: Dennis Pedersen, Aarhus C (DK)

(73) Assignee: ALERT SYSTEMS ApS, Horsholm (DK)

( * ) Notice: Subject to any disclaimer, the term of this patent is extended or adjusted under 35 U.S.C. 154(b) by 0 days.

(21) Appl. No.: 16/320,904

(22) PCT Filed: Jul. 17, 2017

(86) PCT No.: PCT/EP2017/068063
§ 371 (c)(1),
(2) Date: Jan. 25, 2019

(87) PCT Pub. No.: WO2018/019646
PCT Pub. Date: Feb. 1, 2018

(65) Prior Publication Data
US 2019/0164397 A1    May 30, 2019

(30) Foreign Application Priority Data
Jul. 26, 2016  (DK) .................................. 2016 70556

(51) Int. Cl.
*G08B 13/24* (2006.01)
*G08B 29/04* (2006.01)
(Continued)

(52) U.S. Cl.
CPC .............. *G08B 13/248* (2013.01); *G01V 3/10* (2013.01); *G01V 3/12* (2013.01); *G01V 3/38* (2013.01); *G08B 29/046* (2013.01)

(58) Field of Classification Search
CPC .................................. G08B 13/24; G08B 29/04
See application file for complete search history.

(56) References Cited

U.S. PATENT DOCUMENTS

| 6,947,860 B2 | 9/2005 | Frederick et al. |
| 8,416,078 B2 | 4/2013 | Sayegh et al. |

(Continued)

FOREIGN PATENT DOCUMENTS

| CN | 1669063 A | 9/2005 |
| CN | 102498504 A | 6/2012 |

(Continued)

OTHER PUBLICATIONS

International Search Report and Written Opinion for PCT/EP2017/068063, dated Nov. 10, 2017.
(Continued)

*Primary Examiner* — Nabil H Syed
*Assistant Examiner* — Cal J Eustaquio
(74) *Attorney, Agent, or Firm* — Brinks Gilson & Lione; John C. Freeman (57) ABSTRACT

A method of detecting a metal object in a detection zone between a transmitting antenna (101) and a receiving antenna (102) installed in proximity of an automatic door (105; 106), the method comprising: demodulating an amplitude modulated signal received via the receiving antenna to provide a first signal; and on a recurring basis: detecting a first base level of the first signal at a point in time when the first signal is settled at a magnitude at or about the first base level, and following a first signal transition of the first signal, detecting a second base level of the first signal at a point in time when the first signal is settled at a magnitude at or about the second base level; predicting a lower base level to be the lowest of the first base level and the second base level and setting a first threshold value, which is set relative to and lower than the lower base level predicted; and evaluating whether the first signal falls below the first threshold value and setting a first alarm detector at a point in time, while the first signal is below the first threshold value. Thereby it is (Continued)

possible to detect a metal object, such as a 'booster bag', in a detection zone in proximity of automatic doors even at the very moment the automatic door opens.

20 Claims, 5 Drawing Sheets

(51) Int. Cl.
  *G01V 3/12* (2006.01)
  *G01V 3/10* (2006.01)
  *G01V 3/38* (2006.01)

(56) References Cited

U.S. PATENT DOCUMENTS

| | | | |
|---|---|---|---|
| 8,444,055 | B2 | 5/2013 | Makida et al. |
| 2004/0036606 | A1 | 2/2004 | Frederick et al. |
| 2010/0001872 | A1 | 1/2010 | Lian et al. |
| 2011/0109456 | A1 | 5/2011 | Bergman et al. |
| 2011/0304458 | A1 | 12/2011 | Sayegh et al. |
| 2012/0199646 | A1 | 8/2012 | Makida et al. |

FOREIGN PATENT DOCUMENTS

| | | |
|---|---|---|
| CN | 102637335 A | 8/2012 |
| WO | 2008125621 A1 | 10/2008 |
| WO | 2013109486 | 7/2013 |

OTHER PUBLICATIONS

International Preliminary Report on Patentability for PCT/EP2017/068063, dated Jan. 29, 2019.
Office Action and Search Report for Danish Applicaiton No. PA201670556, dated Feb. 22, 2017.
Search Report dated Mar. 5, 2020 from corresponding Chinese Patent Application No. 201780045926.4 (two pages).
Office Action dated Mar. 31, 2020 from corresponding Chinese Patent Application No. 201780045926.4 (five pages).

THEFT PREVENTION SYSTEM AND METHOD

RELATED APPLICATIONS

This application claims the benefit under 35 U.S.C. § 371 of the filing date of International Patent Application No. PCT/EP2017/068063, having an international filing date of Jul. 17, 2017, which claims priority to Danish Application No. DK PA201670556, filed Jul. 26, 2016, the contents of both of which are incorporated herein by reference in their entirety.

Electronic article surveillance (EAS) is a technology for preventing e.g. shoplifting from retail stores. Special tags are fixed to products in a shop. These tags are removed or deactivated by a shop assistant when the item is properly bought or checked out. At the exit of the store, a detection system sounds an alarm or otherwise alerts the staff when it senses active tags.

Various types of tags exist, some of them are made of two strips; a strip of magnetostrictive, ferromagnetic amorphous metal and a strip of a magnetically semi-hard metallic material, which is used as a biasing magnet (to increase signal strength) and to allow deactivation. These strips are not bound together but free to oscillate mechanically.

The detection system for such tags emits, by a transmitting antenna, periodic tonal bursts at about e.g. 58 kHz, the same as the resonance frequency of the amorphous strips. This causes the strip to vibrate longitudinally by magnetostriction, and it continues to oscillate after the burst is over. The vibration causes a change in magnetization in the amorphous strip, which induces an AC voltage in a receiving antenna. If this signal meets the required parameters (correct frequency, repetition, etc.), an alarm is activated.

However, most EAS systems can be circumvented by placing the tagged goods in a bag, a so-called 'booster bag', which is typically a homemade bag lined with an aluminium or other type of metal foil.

When a tagged good is placed in a booster bag, the booster bag will act as a Faraday cage, shielding the tags from the detection system's transmitting and receiving antennas. This provides electromagnetic shielding, with the result that electronic security tags inside the bag may not be detected by security panels in the detector antennas at the store exit.

Although some vendors claim that their acousto-magnetic systems cannot be defeated by bags shielded with aluminium foil, a sufficient amount of shielding (in the order of 30 layers of standard 20 μm foil) will defeat all standard systems. The booster bag can be an ordinary shopping bag, backpack, pocketed garment, or other inconspicuous container whose inside is lined with a special material, typically multiple layers of aluminium foil.

Thus, in addition to a system for detecting such tags there is sometimes installed a separate or integrated detection system for booster bags. The detection systems for booster bags typically also comprise a transmitting antenna and a receiving antenna. However, since such detection systems for booster bags cannot rely on interaction with the tags, they need to be very sensitive to certain electromagnetic fields. This, however, involve complications since the detection systems (of both types) are installed next to automatic doors, often with metal parts, to cover the passage through the door opening. The automatic doors may comprise side-hinged doors, sliding doors, or revolving doors.

RELATED PRIOR ART

WO 2011/139323 A1 (Sensormatic, Inc.) discloses a system for sliding door pattern cancellation. The system attempts to reduce signal interference effects of metal doors in a metal detection system, such as a system for booster bag detection. The system includes a transmitter transmitting an interrogation signal that is used to detect transitory metal objects within the detection region, a receiver receiving instantaneous signals that represent electromagnetic field disturbances during operation of the metal detection system and include electromagnetic field disturbances attributed to the movement of metal doors. The system also includes a metal detection module that determines a resulting waveform representing the difference between the instantaneous signals received during operation of the metal detection system and a recorded pattern of signals representing electromagnetic field disturbances caused by a pattern of movement of the metal doors in the detection region when a transitory metallic object is not present. The recorded pattern is subtracted from the resulting waveform thereby attempting to leave only signals from transitory metal objects.

Thus, this system relies on the recorded pattern of signals representing electromagnetic field disturbances caused by a pattern of movement of the metal doors when a transitory metallic object is not present being a very accurate pattern. Otherwise, the—desired—signals from transitory metal objects will inevitably drown because the amplitude of the recorded signals are magnitudes larger than the amplitude of the signals from transitory metal objects.

WO 2008/125621 A1 (Alert Systems, Aps) also discloses a metal detection system, such as a system for booster bag detection. The system also includes a transmitter transmitting an interrogation signal that is used to detect transitory metal objects within the detection region and a receiver receiving instantaneous signals that represent electromagnetic field disturbances during operation of the metal detection system; wherein the electromagnetic field disturbances may include disturbances attributed to the movement of metal doors and disturbances attributed to a transitory metal object. The described system attempts to discriminate between movement of metal doors and transitory metal object—to avoid false alarms—by determining a time difference between the detection of a first signal transition and a second signal transition in the instantaneous signal. In this way, signal transitions related to door movements can be discriminated from signal transitions relate to transitory metal objects from booster bags. However, it may be that determining the time difference between the detection of a first signal transition and a second signal transition in the instantaneous signal is not always possible or is not always a sufficient criterion to distinguish door movements from booster bags passing the door opening. Thus there is a risk of causing false alarms or not detecting booster bags under certain circumstances.

SUMMARY

There is provided a method of detecting a metal object in a detection zone between a transmitting antenna and a receiving antenna installed in proximity of an automatic door, the method comprising:
  demodulating a signal received via the receiving antenna to provide a first signal; and on a recurring basis:
  detecting a first base level of the first signal at a point in time when the first signal is settled at a magnitude at or about the first base level, and following a first signal transition of the first signal, detecting a second base level of the first signal at a point in time when the first signal is settled at a magnitude at or about the second base level;

predicting a lower base level to be the lowest of the first base level and the second base level and setting a first threshold value, which is set relative to and lower than the lower base level predicted;

evaluating whether the first signal falls below the first threshold value and setting a first alarm detector at a point in time, while the first signal is below the first threshold value.

Thereby it is possible to detect presence of a transiently passing metal object, such as a 'booster bag', in a detection zone in proximity of automatic doors even at the very moment the automatic door opens. The 'booster bag' or another metal object may cause an impulse in the first signal. The impulse is detectable by processing, in real time, as the booster bag passes through the detection zone. A feature value representing the impulse may be computed by the method and may trigger, e.g. by exceeding one or more thresholds, the setting of the first alarm even before the impulse has faded away e.g. before it has faded below a 10% level of its peak magnitude, such as after it has reached a peak magnitude. The impulse, which may represent a transiently passing metal object, such as a booster bag, may be characterized by a peak or a plateau level following a rising/falling slope and followed by a falling/rising slope, respectively.

In some aspects the evaluation of whether the first signal falls below the first threshold value is performed at a point in time when the first signal is about to or has fallen below a second threshold value, which is set at a level between the first base level and the second base level.

In aspects of the method, the transmitting antenna and the receiving antenna are installed and configured with appropriate electronic circuits such that a situation wherein the doors are closed causes the first signal to have a signal amplitude at or about an upper base level, whereas situation wherein the doors are opened causes the first signal to have a signal amplitude at or about the lower base level.

In aspects of the method the steps of detecting, predicting and evaluating are performed repeatedly and consecutively. When the first signal has an alternating, roughly square, but slightly irregular shape (e.g. since base levels of the square are not exactly the same from one signal period to the next one), an upcoming lower level of the square is predicted based on a current lower level of the square. Detection of a metal object can then be performed at the very moment a door opens since the upcoming lower level is predicted in advance of the door opening making it possible to compute the first threshold, for evaluating whether an alarm should be raised (by setting the first alarm detector), also in in advance of the door opening.

In aspects of the method, a higher base level is the highest of the first base level and the second base level and predicting the lower base level is performed during or before a signal transition from the higher base level to a signal level of the first signal at or below the lower base level. In aspects thereof, predicting the lower base is level is predicting an upcoming lower base level before the first signal has settled at the lower base level. In some aspects setting the first threshold value is performed at the same time as predicting the lower base level (or for immediately thereafter). A signal transition may be related to the doors opening or closing. When the doors are closed or open the first signal may be settled at the first base level or the second base level.

In aspects of the method, the method comprises in case the first signal does not drop below the first threshold value, forgo setting the first alarm detector.

In some aspects the signal received via the receiving antenna is an amplitude modulated signal. Demodulation may be amplitude demodulation. The demodulating of the signal received via the receiving antenna may comprise demodulation to detect the phase and/or frequency and/or amplitude of a carrier wave or a sideband signal in a sideband to a carrier wave.

In some aspects the method is performed at an apparatus comprising a processing module loaded with a computer program configured to perform the method as claimed in any of the preceding claims when coupled to a transmitting antenna and a receiving antenna.

In some embodiments the method comprises: detecting a level difference between the first base level and the second base level, and evaluating the level difference against a second threshold; and in case the level difference exceeds the second threshold, enabling the first alarm detector; and in case the level difference does not exceed the second threshold, forgo enabling the first alarm detector.

As explained above, the first signal may have an alternating roughly square shape. The above embodiment may prevent enabling the alarm detector in situations wherein level differences between lower and upper base levels exist, but where a level difference should not be attributed to a door movement or to a door movement between an open position and a closed position.

In some embodiments the method comprises: enabling the first alarm detector, at a point in time when the first signal falls below a second threshold value, which is set at a level between the first base level and the second base level.

Thereby, it is possible to dedicate the first alarm detector to detection of metal objects, such as booster bags, passing the door opening at the very moment in time when the automatic door opens or is about to reach an open position. This may improve reliability of the method giving alarms only at appropriate times.

The second threshold is set at a value between the first base level and the second base level e.g. according to the expression $TH2=(BL1-BL2)/a+BL2$, wherein TH2 is the second base level, BL1 and BL2 are the first and second base level, respectively, and 'a' is a variable e.g. a=2 to set the threshold halfway between the values of BL1 and BL2.

In some embodiments the method comprises: forgo setting the first alarm detector in case the first signal falls below the lower base level predicted, but not below the first threshold value, which is set below the lower base level by a first margin.

It has been observed that the first signal may comprise a 'dip' or an 'undershoot' that may occur for a short period of time (e.g. less than 500 ms) at the moment an automatic door opens. This is very unfortunate since such a 'dip' (a phantom booster bag) may coincide with a somewhat similar 'dip' caused by a booster bag passing the door opening. However, according to the above embodiment, the risk of erroneously raising an alarm due to a 'phantom booster bag' is reduced. The 'magnitude' of the 'phantom booster bag' may be measured and the first threshold may be set below the 'dip' i.e. by a margin below the lower base level.

One reason for the occurrence of a 'phantom booster bag' may be that the automatic door is not appropriately maintained.

In some embodiments an upper base level is the highest of the first base level and the second base level, and the method comprises: when the first signal has a magnitude below a second threshold value, which is set at a level between the first base level and the second base level and is settled at a magnitude level, predicting the lower base level again.

In this way, an upcoming lower level can be reliably predicted for being able to immediately detect a booster bag even when the booster bag passes the door opening the very moment the door becomes open. Reliably detecting a booster bag depends on such an upcoming lower level being reliably predicted.

Thus, also in this embodiment, the second threshold is set at a value between the first base level and the second base level e.g. according to the expression TH2=(BL1−BL2)/a+ BL2, wherein TH2 is the second base level, BL1 and BL2 are the first and second base level, respectively, and 'a' is a variable e.g. a=2 to set the threshold halfway between the values of BL1 and BL2.

The point in time, when the magnitude of the first signal falls below a second threshold value, may be determined instantaneously e.g. within one or a few sample time periods.

The point in time when the first signal is settled at a magnitude level may be determined by computing the norm, e.g. the 1-norm or 2-norm, of a low-pass filtered version of the first signal and evaluating the difference between the norm and the magnitude of the first signal against a threshold value for evaluating when the difference is small enough that the first signal can be determined to be settled.

In some embodiments the method comprises: when the first signal has a magnitude below a second threshold value, which is set at a level between the first base level and the second base level and is settled at a magnitude level, enabling a second alarm detector.

Thereby the second alarm detector is enabled only in situations in which it detects booster bags reliably, not issuing false alarms, only issuing alarms when booster bags are present. The second alarm detector may be disabled at a point in time when the first signal settles at the lower base level. At that point in time, or before, a second alarm detector may be enabled.

In some embodiments the method comprises: setting the second alarm detector in case the first signal assumes a magnitude below a third threshold value, which is set at or below the lower base level.

In some embodiment the method comprises computing a gradient of the first signal; and detecting the event that the gradient exceeds a fourth threshold, which is set at a level which the gradient fails to exceed at times when the automatic door moves while a metal object is not transiently passing the detection zone; and which fourth threshold the gradient does exceed at times when the automatic door moves while a metal object is transiently passing the detection zone; and based on the event being detected, enabling and/or setting the first alarm detector. Thereby booster bags passing the detection zone right at the moment when the automatic doors open can be more reliably detected.

The gradient may be computed as it is known in the art by computing values of the gradient based on a differential quotient. The differential quotient may be computed for each sample value of the first signal or over a range of sample values. In case the first signal is an analogue signal, the differential quotient may be determined via a high-pass type filter. The gradient may be computed by registering the duration from when the first signal falls below the second base level and continues until it reaches the first base level. The gradient may be based on determining this duration of time, i.e. the duration of the transition from the second base level to the first base level. Since the first signal may have a magnitude slightly above or below the base levels, the duration of the transition from the second base level to the first base level may be based on thresholds about the base levels.

In some embodiments the first alarm detector is enabled at least for some time when the first signal has a magnitude below the second threshold value, which is set at a level between the first base level and the second base level.

There is also provided a method of detecting presence of a bag lined with or made from metal foil according to any of the preceding claims.

There is also provided a computer-readable medium carrying a program configured to perform the method as claimed in any of the preceding claims when the method is a computer-implemented method run on a computer.

There is also provided an apparatus with a processing module loaded with a computer program configured to perform the method as claimed in any of the preceding claims when coupled to the transmitting antenna and the receiving antenna.

In some embodiments the apparatus comprises a processing module configured to perform electronic article surveillance by detecting an electromagnetically induced vibration in a tag via transmitting and receiving antennas.

There is also provided a system comprising: a transmitter coupled to a transmitting antenna for emitting an electromagnetic interrogation signal; a receiver with a demodulator coupled to a receiving antenna; and a processor configured to:

demodulate a signal received via the receiving antenna to provide a first signal;

detect a first base level of the first signal at a point in time when the first signal is settled at a magnitude at or about the first base level, and following a first signal transition of the first signal, detect a second base level of the first signal at a point in time when the first signal is settled at a magnitude at or about the second base level;

predict a lower base level to be the lowest of the first base level and the second base level and setting a first threshold value, which is set relative to and lower than the lower base level predicted; and evaluate whether the first signal falls below the first threshold value and set a first alarm detector at a point in time, while the first signal is below the first threshold value.

The interrogation signal may be a carrier signal, such as a signal comprising one or more tones at about 20-40 KHz. The signal received via the receiving antenna may be demodulated by amplitude demodulation.

In some embodiments the system comprises one or both of a sound generator and a light source for alerting personnel people.

Here and in the following, the terms 'apparatus', 'processor', 'unit' and 'module' are intended to comprise any circuit and/or device suitably adapted to perform the functions described herein. In particular, the above term comprises general purpose or proprietary programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

BRIEF DESCRIPTION OF THE FIGURES

A more detailed description follows below with reference to the drawing, in which.

DETAILED DESCRIPTION

Figure 1:
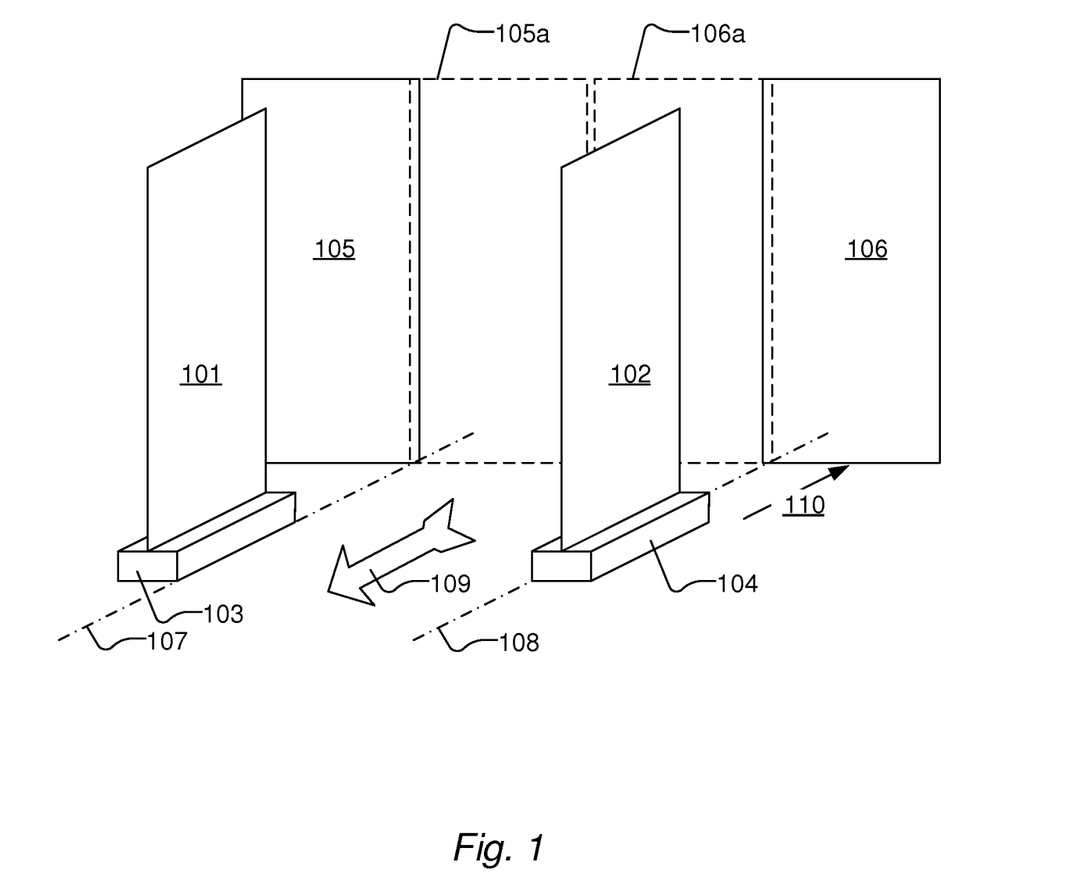
FIG. 1 shows a transmitting antenna and a receiving antenna arranged in proximity of automatic doors.

FIG. 1 shows a transmitting antenna and a receiving antenna arranged in proximity of automatic doors. The automatic doors are shown as sliding doors 105 and 106 shown in an open position. The doors 105 and 106 are also shown in a closed position 105a and 106a, respectively. The doors may have a metal frame as part of its construction or functionally form a metal frame at frequencies in the range of about 20-40 KHz. When the doors are in their open position a passage, indicated by dashed-dotted lines 107 and 109, into a facility at which the doors are installed is made accessible as indicated by arrow 109.

In proximity of the doors and on each side of the passage a transmitting antenna 101 and a receiving antenna 102 are installed. The transmitting antenna 101 stands on a base 103 and the receiving antenna stands on a base 104. The base 103 hosts a first electronic circuit for driving the transmitting antenna with a carrier signal at about 20-40 KHz. The base 104 hosts a second electronic circuit for demodulating the received signal, which is amplitude modulated by a metallic object passing between the antennas, and a third electronic circuit for processing the demodulated received signal to detect a metal object, such as a 'booster bag', in a detection zone in proximity of the automatic doors. The second electronic circuit is also denoted a pre-processor and the third electronic circuit is also denoted a processor.

Figure 2:
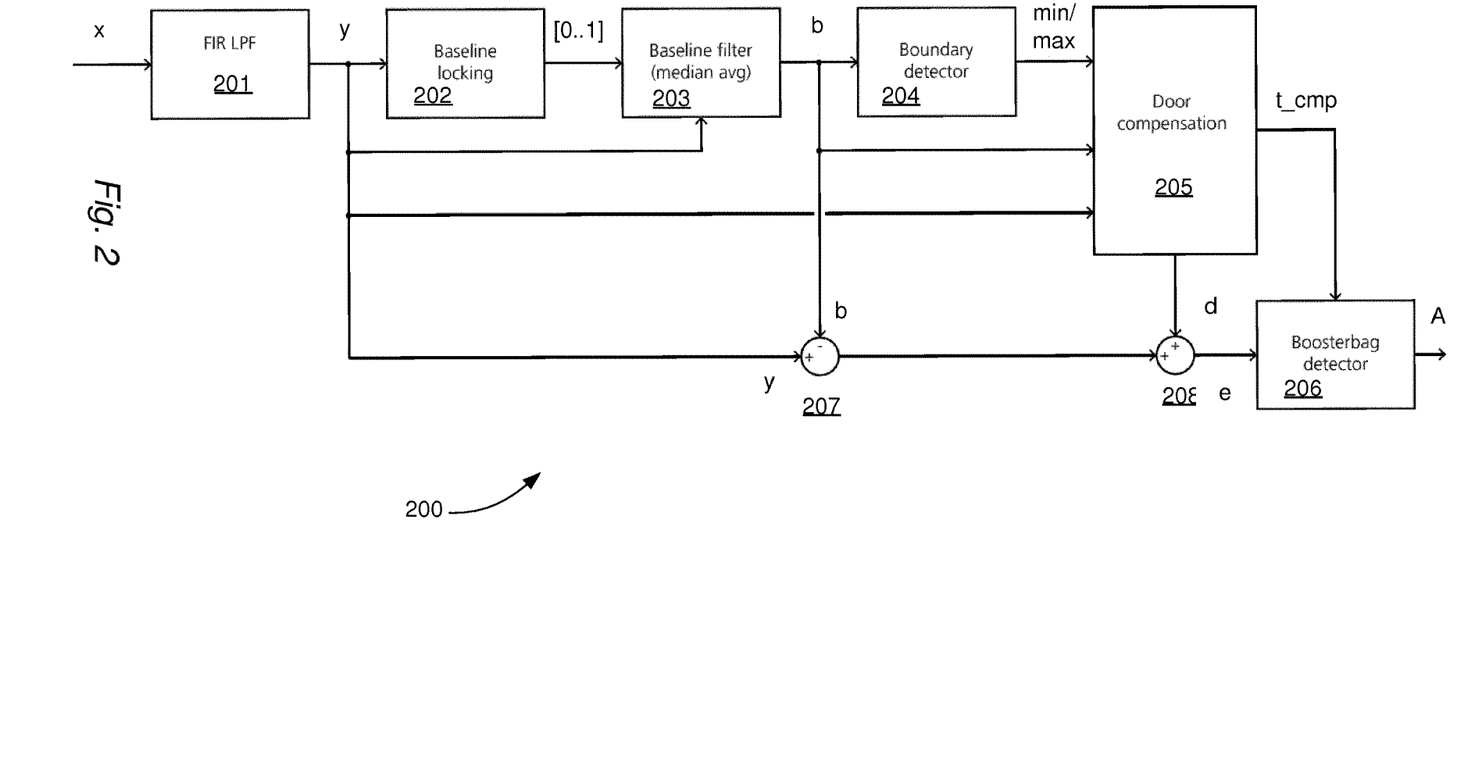
FIG. 2 shows a block diagram of a processor for detecting a metal object in a detection zone between a transmitting antenna and a receiving antenna.

FIG. 2 shows a block diagram of a processor for detecting a metal object in a detection zone between a transmitting antenna and a receiving antenna. The processor 200 receives a digital signal, x, from a pre-processor (not shown). The pre-processor is coupled to receive an analogue signal, which can be characterized as an amplitude modulated signal, from the receiving antenna and perform demodulation and analogue-to-digital conversion to provide the digital signal, x. At least a portion of the analogue signal received by the receiving antenna originates from the transmitting antenna that transmits a carrier signal e.g. at a frequency of about 20-40 KHz, typically 17-30 KHz, with a constant, predefined amplitude. A metal or metallic object, such as a booster bag, passing between the transmitting and the receiving antenna modulates (changes) the amplitude of the carrier signal as received by the receiving antenna. The change may be a drop in signal strength or an increase in signal strength. A change due the presence of a booster bag may be a drop in signal strength as small as 1-2 percent or less of the predefined signal strength or amplitude.

When received at the processor 200, the digital signal, x, is low-pass filtered by a FIR filter 201 with a cut-off frequency of about 3-5 Hz to provide a low-pass filtered signal, y. The FIR filter removes noise at frequencies above the cut-off frequency. The FIR filter may be replaced by another type of filter such as an IIR filter. The cut-off frequency is selected to suppress noise, such as noise from electrical appliances, while making an effect of a booster bag remain clear and detectable.

The low-pass filtered signal, y, is branched to a baseline locking unit 202, a baseline filter 203, a door compensation unit 205 and a first adder 207.

The baseline locking unit 202 detects whether a first-order derivative (with respect to time) of the low-pass filtered signal y is below a predefined threshold thereby indicating that the magnitude of the low-pass filtered signal, y, is at a plateau or base level. In the positive event thereof, the baseline filter 203 performs a median filtering of the filtered signal, y, to output a corrected signal 'b'. The baseline filter 203 introduces a delay corresponding to the filter length of the median filter. The filter length may be e.g. 11 samples or shorter or longer. In the negative event, i.e. the first-order derivative is not below a predefined threshold, it may indicate that the low-pass filtered signal, y, transitions from a first base level to a second base level and the corrected signal, b, is then kept at its most recent level. Thus, the corrected signal, b, is expected to show a square wave with relatively smooth base levels and relatively steep transitions occurring once the low-pass filtered signal, y, has reached and settled at a base level. This is illustrated by a dashed line and vertical arrows in diagram (B) of FIG. 3. The corrected signal, b, has a more rectangular shape than the low-pass filtered signal, y.

As shown, the corrected signal, b, is subtracted from the low-pass filtered signal, y, by means of the first adder 207. The output of the first adder 207 thereby represents differences between the more 'rectangular square wave' in the corrected signal, b, and the low-pass filtered signal, y.

A boundary detector 204 receives the corrected signal, b, and outputs a 'lower base level' and a 'upper base level' as the minimum and maximum, respectively, thereof. Thereby, a first base level of the first signal is detected at a point in time when the first signal is settled at a magnitude at or about the first base level, and following a first signal transition of the first signal, a second base level of the first signal is detected at a point in time when the first signal is settled at a magnitude at or about the second base level. This processing is performed continuously or repeatedly.

Further, the boundary detector 204 verifies that the 'lower base level' and the 'upper base level' fall within respective predefined ranges. If a base level does not fall within a predefined range, the corresponding value is maintained at the value it had before. The predefined ranges may be set about the level of the respective base level. During a start-up of the processor the boundary detector may forgo verifying that the 'lower base level' and the 'upper base level' fall within respective predefined ranges until one or more 'lower base levels' and 'upper base levels' have been established.

A door compensation unit 205 receives the 'lower base level' and the 'upper base level from the boundary detector 205, the corrected signal b, and the low-pass filtered signal, y. By means of a second adder 208, the door compensation unit 205 shifts the signal output from the second adder 208 such that a booster bag detector 206 can detect a booster bag the moment the door becomes open. The door compensation unit 205 shifts the level via the signal 'd', which is set to: d=max−min in case the low-pass filtered signal, y, is less than min and the corrected signal, b, is larger than (max−min)/2; and is set to d=0 otherwise; wherein 'max' and 'min' are the levels of the upper base level and the lower base level, respectively.

Thereby, the door compensation unit 205 provides that the input signal, e, to the booster bag detector 206 is at a reference level (e.g. 0) the moment the automatic doors open. A booster bag passing the detection zone between the antennas will then be represented in the input signal, e, to the booster bag detector 206 in the form of a 'dip' (a negatively going impulse). Thus, the processor 200 generates an input signal, e, wherein the effect of automatic doors is diminished or removed—at least at times about the moment the automatic doors open.

The door compensation unit 205 outputs a signal t_cmp to the booster bag detector 206; t_cmp represents an amount of compensation (e.g. represented by a number of samples) to apply (e.g. by adding) to the duration (pulse width) of the negatively going impulse representing a booster bag. It has been discovered that the pulse width of an impulse caused by a booster bag may shrink when the booster bag passes while the automatic doors are still moving or are about to reach their fully open position. Thus, compensation may be added when a transition from the upper base level to the lower base level occurs in the low-pass filtered signal, y.

The compensation (pulse width compensation) is applied by the booster bag detector 206. The booster bag detector 206 performs an evaluation of the impulse comprising evaluating one or more of:
  the pulse width of the impulse with or without pulse width compensation;
  the magnitude of the impulse; and
  the polarity of the impulse.

The evaluation of the impulse may be performed as described in more detail below in connection with FIG. 5 e.g. by a state-machine, denoted a metal detector state machine.

In some embodiments the booster bag detector 206 performs an operation wherein sample values of input signal, e, are accumulated or integrated while an impulse is present. At the point in time when a thereby accumulated or integrated value reaches a predefined threshold an alarm may be issued. Detection of when an impulse is present may be performed by detecting the point in time when the low-pass filtered signal, y, falls below the lower base level ('min').

The alarm may be issued by transmitting a wired or wireless signal to a device installed at a payment desk or to a mobile device and may be given as a visual and/or audible alarm. The alarm may also be issued at the base 103 and/or the base 104 of the antennas.

Figure 3:
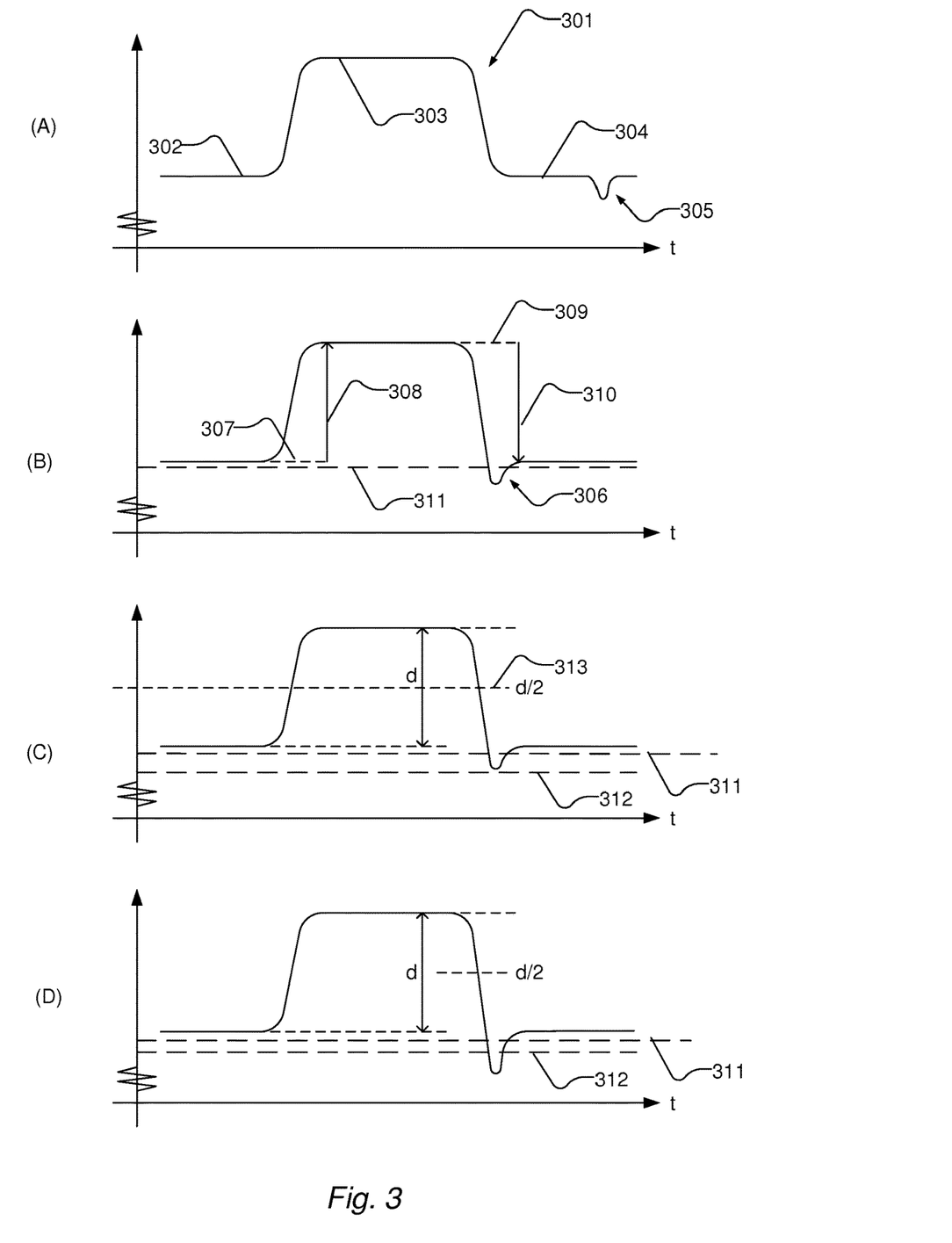
FIG. 3 shows exemplified signals received by the receiving antenna.

FIG. 3 shows exemplified signals, depicted in diagrams (A) through (D), received by the receiving antenna.

In diagram (A) an exemplary low-pass filtered signal 301 is shown. The low-pass filtered signal 301 assumes signal values at a lower base level 302 at times when the automatic doors are open, transitions to signal values at an upper base level 303 while the doors close, and assumes signal values at the upper base level 303 while the doors are closed. When the doors are fully open (again) the low-pass filtered signal 301 assumes signal values at a lower base level 304. The lower base level 302 may differ from the lower base level 304 especially when the doors have opened and closed several or many times in between (not shown).

In some circumstances (handled by conventional technology) a booster bag impulse 305 occurs sometime after the low-pass filtered signal has settled at the lower base level 304.

However, as shown in diagram (B) it may happen that a booster bag impulse occurs while the automatic doors are still moving or the moment they reach an open position. In such a case conventional technology fails to detect a booster bag. In connection with diagram (B) it is shown that the corrected signal 'b' (mentioned above) follows the dashed line 307, the upwardly pointing arrow 308, the dashed line 309 and the downwardly pointing arrow 310. As mentioned above, the corrected signal 'b' has flanks or transitions that occur delayed relative to the transitions of the low-pass filtered signal, y. The dashed line 311 represents a first threshold which may be set at the lower base level ('min') or slightly offset therefrom. This first threshold may be used for detection the point in time a booster bag impulse begins (and ends).

Diagram (C) illustrates a situation wherein a door moves in a wobbly way and causes, by its wobbly movement, an impulse that somehow resembles or may be confused with a booster bag impulse. However, it has been observed that a booster bag impulse in many cases has a larger amplitude. Therefore a second threshold 312 may be further offset from the lower base level.

Diagram (C) illustrates a situation wherein a booster bag exceeds the second threshold.

With respect to diagram (A) through (D) it should be noted that the ordinate (y-axis) represents amplitude and that the axis is 'broken' since typically the magnitude of signal variation is very small compared to the magnitude of the signal; the abscissa (x-axis) represents time, t.

In general it should be noted that the special tags fixed to products in the shop are removed or deactivated by a shop assistant when the item is properly bought or checked out. A detacher is used to remove re-usable hard tags. The type of detacher used will depend on the type of tag. There are a variety of detachers available, with the majority using powerful magnets.

Figure 4:
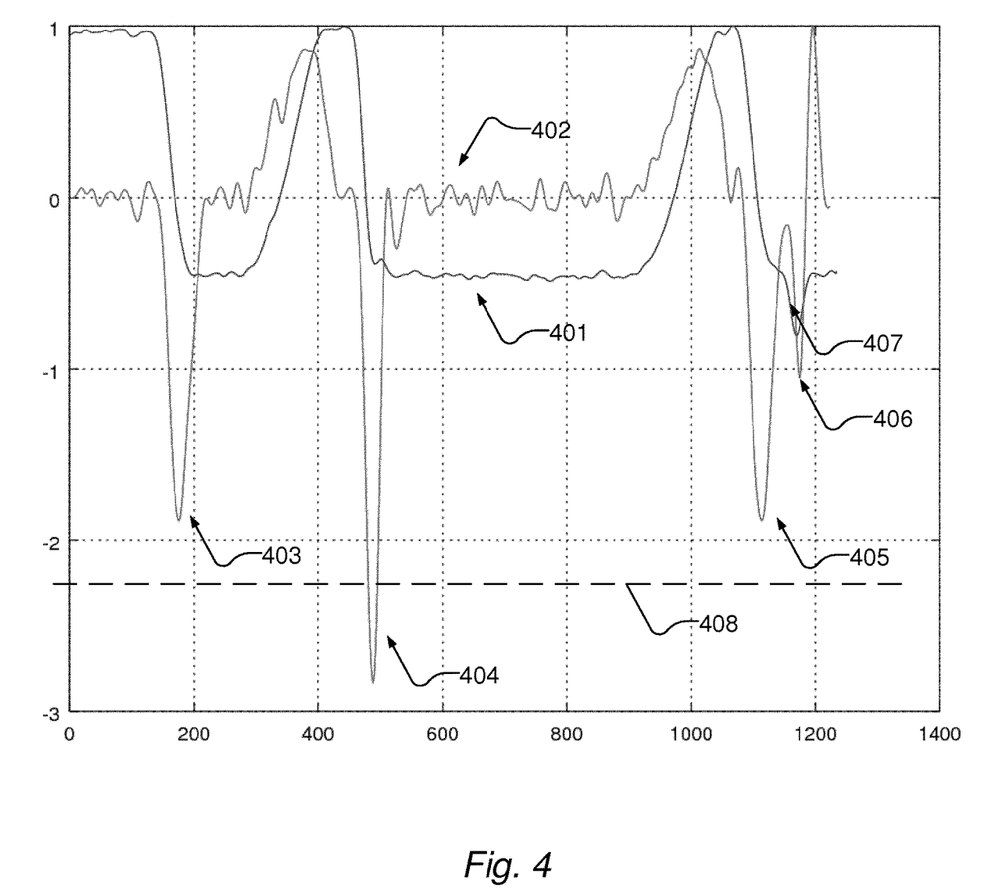
FIG. 4 shows an example of a portion of the first signal and a gradient computed therefrom.

FIG. 4 shows an example of a portion of the first signal and a gradient computed therefrom. The first signal 401 and the gradient 402 are shown over a period of time represented by approximately 1250 samples along the abscissa axis and with its magnitude along the ordinate axis represented by values between 1 and −3. The depicted portion of the first signal 401 comprises three level transitions from the aforementioned second base level to the aforementioned first base level at about sample 150, sample 450 and sample 1100. The gradient 402 has corresponding peaks 403, 404 and 405. At times, about sample 150, when the automatic door moves while a metal object is not transiently passing the detection zone, the peak 403 of the gradient 402 fails to exceed a fourth threshold 408. This is also the case at about sample 1100, where the peak 405 of the gradient 402 fails to exceed the fourth threshold 408. On the contrary, at times, about sample 450 when the automatic door moves while a metal object is transiently passing the detection zone, the transition from the second base level to the first base level is faster and the peak 404 of the gradient 402 is larger, exceeding the fourth threshold 408. The gradient 402 may be computed based on the first signal at all times or at times when the first signal 301 has a magnitude below the aforementioned second threshold value, which is set at a level between the first base level and the second base level.

As illustrated about sample 1150, a booster bag or another metal object may pass the detection zone short after the automatic door has reached an open position; whereby the an impulse 407 is detectable based one or both of the first signal 401 and the gradient 402 about points indicated by 406 and 407.

Figure 5:
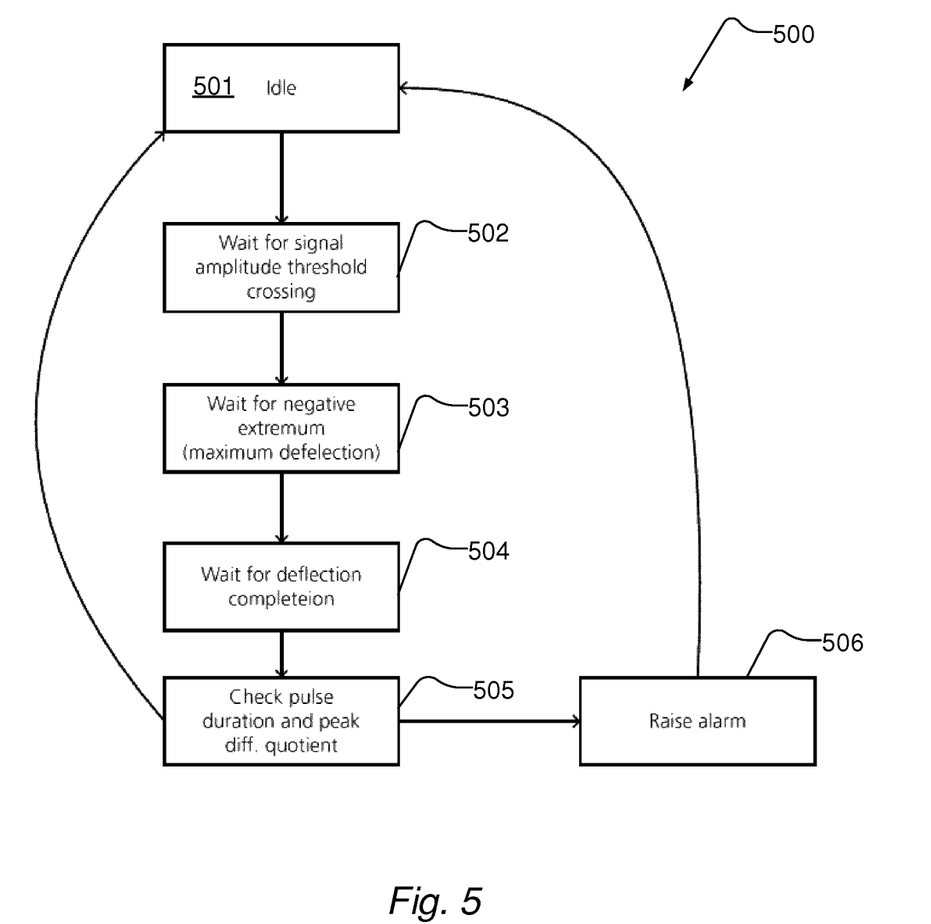
FIG. 5 shows a metal detector state machine.

FIG. 5 shows a metal detector state machine. The metal detector state machine 500 is coupled to receive the signal, e, described above. The metal detector state machine 500 receives the signal, e, and computes a first order differential quotient signal, dq, with respect to time and computes a second order differential quotient signal, ddq, also with respect to time. Such that signals e, dq and ddq are available for controlling state transitions of the state machine. At state 501 the state machine is idle e.g. upon the state machine being powered on and transitions to state 502 in the event that the differential quotient signal dq drops below a slope threshold thereby indicating that the signal e begins to fall from a base level. In state 502 the magnitude of the signal e is registered a first time (i.e. the magnitude of the base level is registered) and a timer, which is continually incremented while the state machine is not idle is reset. The timer measures the duration of a pulse which is about to occur. Then, in the event that signal e falls below a magnitude threshold the state machine transitions from state 502 to state 503. The state machine remains in state 503 until the differential quotient signal, dq, becomes positive, which indicates that an extremum (minimum) has been reached, whereupon the magnitude of signal e is registered a second time and the difference between the magnitude of signal e measured the first time and the magnitude of signal e measured the second time is computed thereby representing the magnitude of the pulse. Then the state machine transitions to state 504 in which it remains until the second order differential quotient signal, ddq, gets negative (thereby indicating that the pulse is about to revert to the base level), whereby the state machine transitions to state 505. In state 505 the timer is read and its count indicates the duration of the pulse. Thus, the magnitude of the pulse (impulse) and its duration is represented. These and optionally other measures may be compared against a set of criteria. In case this set of criteria are fulfilled the state machine transitions to state 506 wherein an alarm is raised. As mentioned above, the alarm may be issued by transmitting a wired or wireless signal to a device installed at a payment desk or to a mobile device and may be given as a visual and/or audible alarm. The alarm may also be issued at the base 103 and/or the base 104 of the antennas.

The above description is based on the assumption that a metal object causes a negatively going impulse, however, without departing from the principle described, the description extends to a positively going impulse with the necessary modifications.

The invention claimed is:

1. A method of detecting a metal object in a detection zone between a transmitting antenna and a receiving antenna installed in proximity of an automatic door, the method comprising:
    demodulating a signal received via the receiving antenna to provide a first signal; and
    detecting a first base level of the first signal at a point in time when the first signal is settled at a magnitude at or about the first base level, and following a first signal transition of the first signal, detecting a second base level of the first signal at a point in time when the first signal is settled at a magnitude at or about the second base level;
    predicting a lower base level to be the lowest of the first base level and the second base level and setting a first threshold value, which is set relative to and lower than the lower base level predicted;
    evaluating whether the first signal falls below the first threshold value and setting a first alarm detector at a point in time, while the first signal is below the first threshold value.

2. A method according to claim 1, comprising:
    detecting a level difference (d) between the first base level and the second base level, and evaluating the level difference against a second threshold;
    in case the level difference (d) exceeds the second threshold, enabling the first alarm detector; and in case the level difference does not exceed the second threshold, forgo enabling the first alarm detector.

3. A method according to claim 1 comprising:
    enabling the first alarm detector, at a point in time when the first signal falls below a second threshold value, which is set at a level between the first base level and the second base level.

4. A method according to claim 1, comprising:
    forgo setting the first alarm detector in case the first signal falls below the lower base level predicted, but not below the first threshold value, which is set below the lower base level by a first margin.

5. A method according to claim 1, wherein an upper base level is the highest of the first base level and the second base level, comprising:
    when the first signal has a magnitude below a second threshold value, which is set at a level between the first base level and the second base level and is settled at a magnitude level, predicting the lower base level again.

6. A method according to claim 5, comprising:
    when the first signal has a magnitude below a second threshold value, which is set at a level between the first base level and the second base level and is settled at a magnitude level, enabling a second alarm detector.

7. A method according to claim 6, comprising:
    setting the second alarm detector in case the first signal assumes a magnitude below a third threshold value, which is set at or below the lower base level.

8. A method according to claim 1, comprising:
    computing a gradient of the first signal; and
    detecting the event that the gradient exceeds a fourth threshold, which is set at a level which the gradient fails to exceed at times when the automatic door moves while a metal object is not transiently passing the detection zone; and which fourth threshold (408) the gradient does exceed at times when the automatic door moves while a metal object is transiently passing the detection zone; and
    based on the event being detected, enabling and/or setting the first alarm detector.

9. A method according to claim 8, wherein the first alarm detector is enabled at least for some time when the first signal has a magnitude below the second threshold value, which is set at a level between the first base level and the second base level.

10. A method of detecting presence of a bag lined with or made from metal foil according claim 1.

11. A non-transitory computer-readable medium carrying a program configured to perform the method according claim 1 when the method is a computer-implemented method run on a computer.

12. An apparatus with a processing module loaded with a computer program configured to perform the method according claim 1 when coupled to the transmitting antenna and the receiving antenna.

13. An apparatus according to claim 12, wherein the apparatus comprises a processing module configured to perform electronic article surveillance by detecting an electromagnetically induced vibration in a tag via transmitting and receiving antennas.

14. A system comprising:
a transmitter coupled to a transmitting antenna for emitting an electromagnetic interrogation signal;
a receiver with a demodulator coupled to a receiving antenna;
a processor configured to:
demodulate a signal received via the receiving antenna to provide a first signal;
detect a first base level of the first signal at a point in time when the first signal is settled at a magnitude at or about the first base level, and following a first signal transition of the first signal,
detect a second base level of the first signal at a point in time when the first signal is settled at a magnitude at or about the second base level;
predict a lower base level to be the lowest of the first base level and the second base level and setting a first threshold value, which is set relative to and lower than the lower base level predicted; and
evaluate whether the first signal falls below the first threshold value and set a first alarm detector at a point in time, while the first signal is below the first threshold value.

15. A system according to claim 14, comprising one or both of a sound generator and a light source for alerting personnel people.

16. A method according to claim 2, comprising:
enabling the first alarm detector, at a point in time when the first signal falls below a second threshold value, which is set at a level between the first base level and the second base level.

17. A method according to claim 2, comprising:
forgo setting the first alarm detector in case the first signal falls below the lower base level predicted, but not below the first threshold value, which is set below the lower base level by a first margin.

18. A method according to claim 2, wherein an upper base level is the highest of the first base level and the second base level, comprising:
when the first signal has a magnitude below a second threshold value, which is set at a level between the first base level and the second base level and is settled at a magnitude level, predicting the lower base level again.

19. A method according to claim 2, comprising:
computing a gradient of the first signal; and
detecting the event that the gradient exceeds a fourth threshold, which is set at a level which the gradient fails to exceed at times when the automatic door moves while a metal object is not transiently passing the detection zone; and which fourth threshold the gradient does exceed at times when the automatic door moves while a metal object is transiently passing the detection zone; and
based on the event being detected, enabling and/or setting the first alarm detector.

20. A method of detecting presence of a bag lined with or made from metal foil according claim 2.

* * * * *

UNITED STATES PATENT AND TRADEMARK OFFICE
CERTIFICATE OF CORRECTION

PATENT NO. : 10,796,546 B2
APPLICATION NO. : 16/320904
DATED : October 6, 2020
INVENTOR(S) : Dennis Pedersen Page 1 of 1

It is certified that error appears in the above-identified patent and that said Letters Patent is hereby corrected as shown below:

In the Claims

In Column 12, Claim 3, Line 9, insert -- , -- after "1".

In Column 12, Claim 8, Line 41, delete "(408)".

Signed and Sealed this
Tenth Day of November, 2020

Andrei Iancu
*Director of the United States Patent and Trademark Office*